United States Patent [19]

Spoth et al.

[11] 3,909,724

[45] Sept. 30, 1975

[54] START BIT DETECTOR AND DATA STROBER FOR ASYNCHRONOUS RECEIVER

[75] Inventors: James J. Spoth, Euclid; Robert J. Robbins, Walten Hills, both of Ohio

[73] Assignee: Addressograph Multigraph Corporation, Cleveland, Ohio

[22] Filed: June 26, 1973

[21] Appl. No.: 373,772

[52] U.S. Cl. .................. 325/321; 178/69.5

[51] Int. Cl. .................. H04b 1/10; H041 7/08

[58] Field of Search .................. 178/53, 69.5 R; 325/321–325, 341, 55; 179/15 BA, 15 BV

[56] References Cited

UNITED STATES PATENTS

| | | | |
|---|---|---|---|
| 3,309,463 | 3/1967 | Roedl | 178/69.5 R |
| 3,327,219 | 6/1967 | Cunningham | 325/325 |
| 3,346,693 | 10/1967 | Green et al. | 178/53 |
| 3,366,930 | 1/1968 | Bennett et al. | 325/324 |

*Primary Examiner*—George H. Libman
*Attorney, Agent, or Firm*—Harry M. Fleck, Jr.

[57] ABSTRACT

An asynchronous data receiver is provided comprising a start bit detector which samples the received data at a clock rate which is a multiple of the data bit rate and analyzes a plurality of consecutive samples to distinguish an actual start bit from noise spikes, or the like. When receipt of an actual start bit has been confirmed, a bit rate clock source is started by the detector at mid-bit position of the start bit, whereby each of the data bits of a character is strobed at mid-bit time.

6 Claims, 3 Drawing Figures

START BIT DETECTOR AND DATA STROBER FOR ASYNCHRONOUS RECEIVER

BACKGROUND OF THE INVENTION

The present invention is generally related to data communications and, more particularly, to an improved asynchronous data receiver for use with data modems, or the like.

In recent years, a vast number of systems have been developed which utilize data terminals or other equipment for the transfer of information in digital form between two points. Generally, such equipment transmits and/or receives data by way of telephone lines, with a data modem at each end of the line. When utilizing such a system of data transmission, it is essential that the data received be identical to the transmitted data. In many systems, it is not uncommon that during transmission the data may be distorted by noise which is picked up on the line, such appearing in the form of spikes of relatively short duration. This presents many problems in systems involving the asynchronous transmission and receiving of digital data, since the receiver must have the capability of recognizing the beginning of each data character or a word as it is received. With many conventional asynchronous receivers, noise spikes which occur on the line may be interpreted by the receiver as a logic transition indicative of the beginning of a data character.

Heretofore, various solutions to this problem have been proposed in order to eliminate the noise spikes or detect the presence of such to ascertain that the data received is erroneous. However, such systems, for the most part, have either been highly complex in nature or have proven to be unreliable.

Accordingly, it is an object to the present invention to provide a unique asynchronous receiver which overcomes the above-mentioned shortcomings of conventional asynchronous receivers.

Another object of the present invention is to provide an improved asynchronous receiver with means for detecting receipt of a start bit, or the like, at the beginning of each logic character, which means is immune to typical noise spikes, or the like, whereby an actual start bit is distinguished from transitions in the form of noise.

It is a further object of the present invention to provide a versatile asynchronous receiver with a start bit detector which samples the received data at a rate which is a multiple of the bit rate and analyzes the samples to determine whether the transition is associated with a start bit or noise spike.

Still another object of the present invention is to provide a novel asynchronous receiver which detects start bits at mid bit position and initiates operation of a bit rate clock with strobes each subsequent bit of a character at mid bit position.

SUMMARY OF THE INVENTION

Briefly, these and other objects are achieved in accordance with the invention by sampling the received data at a rate which is a multiple of the bit rate and storing a predetermined number of the samples in a shift register or other storage means with the outputs connected to a gating circuit or equivalent which is enabled only when a start bit has been received. Enablement of the gating circuit occurs at or near the center of the start bit and is effective to initiate operation of a bit rate clock for sampling each subsequent data bit at mid bit position. Also, upon detection of a start bit, the gating circuit is inhibited for a predetermined number of bit times in order that subsequent data bits will not be interpreted by the start bit detector as start bits. As a character is received, the number of data bits is counted with the count corresponding to the stop bit being effective to remove the inhibit signal to the gate circuit, thereby enabling the detector to watch for the next start bit of a character.

DESCRIPTION OF THE DRAWINGS

The invention will be more fully understood from the following detailed description taken in conjunction with the accompanying drawings, in which.

DESCRIPTION OF THE PREFERRED EMBODIMENT

As mentioned above, one of the objects of the asynchronous receiver of the present invention is to identify the receipt of digital data as it is made available to the receiver by detecting a start bit, or the like, which is indicative of the beginning of a data character. The term "start bit" is intended to include any logic level, 0 or 1, which immediately precedes the digital data information of a character. For the purposes of description, operation of the preferred embodiment is hereinafter explained in the specification and drawings are based with the start bit of a received data character being of logic 0 and the stop bit being of logic 1.

Figure 1:
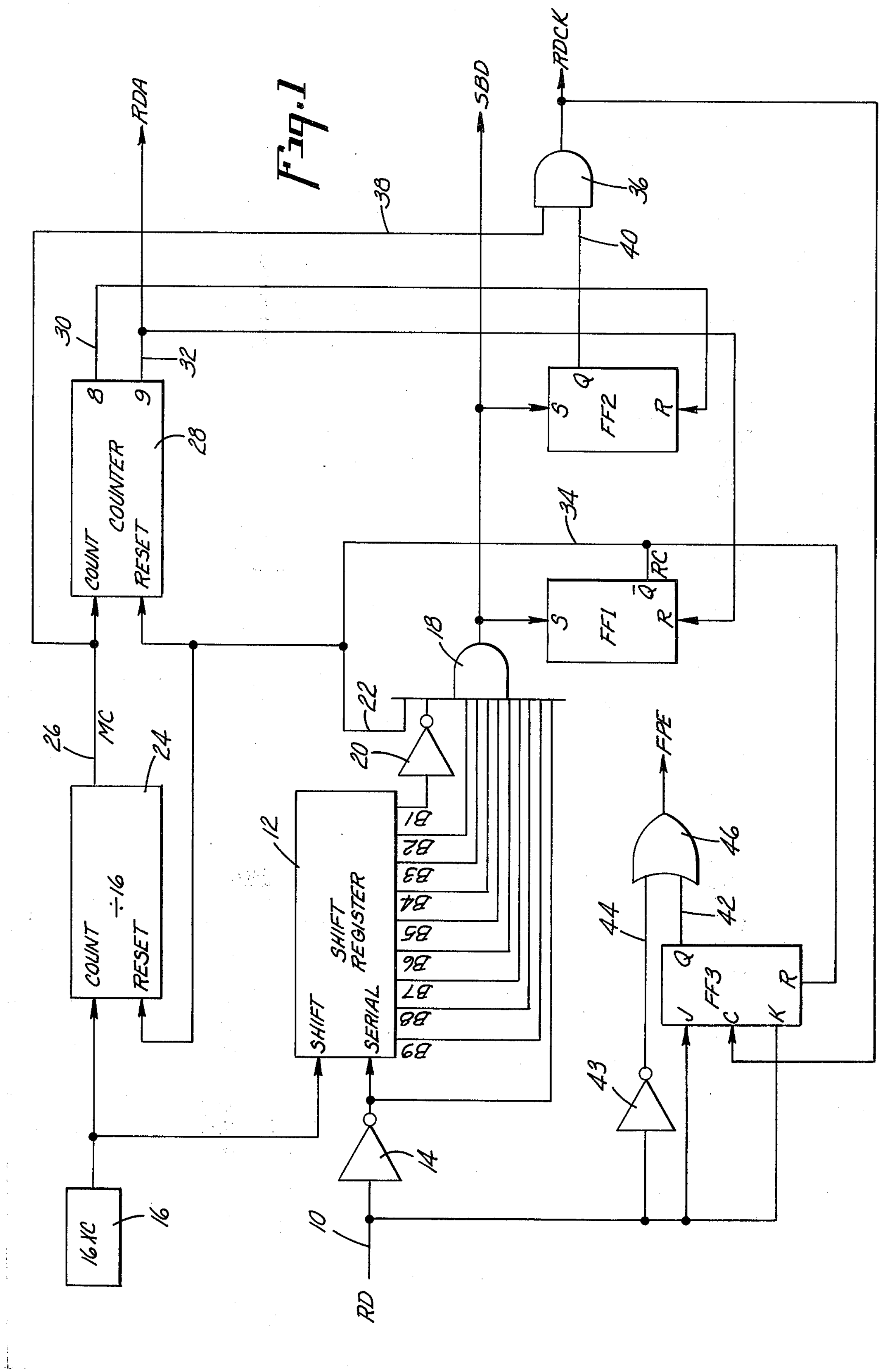
FIG. 1 is a block diagram of a preferred embodiment of the circuitry of asynchronous receiver of the present invention.

Referring now, more particularly, to FIG. 1 of the drawing, a block diagram of a preferred circuit of the receiver of the present invention is illustrated. Data RD is received from a modem, or other appropriate source, by a line 10 and is fed to a serial-to-parallel shift register 12 by way of an invertor 14. Typically, the data which is received by a line 10 includes a start bit, followed by a predetermined number of data bits and a stop bit. The start and stop bits may be of either logic 1 or 0. For the purposes of description the disclosed circuitry is adapted to operate with data characters having a start bit which is of a logic 0 and a logic 1 stop bit. When no data is being received, line 1 is high. When digital information is received it is made available at a predetermined "bit rate" and is shifted into a shift register 12 at a rate which is a predetermined multiple of the bit rate. This is controlled by an appropriate clock source, such as that indicated at 16 in FIG. 1. For the purpose of explanation, clock source 16 is illustrated as being 16 times (16XC) the bit rate. Of course, other multiple clock rates could be utilized, if so desired, and if such are compatable with the shift register and lend themselves to distinguishing start bits from noise as hereinafter explained. Preferably, the shift register 12 is provided with parallel outputs labeled B1 through B9 equal in number to one half the clock rate multiple of the bit rate plus 1. In the example, with each bit width being equal to 16 clock pulses, the shift register capacity corresponds to one half of a bit width plus one clock.

Shift register outputs B1 through B9 are connected to an AND gate 18, or other appropriate gating means, with the B1 output being inverted at 20. It will be appreciated that when a shift register outputs B2 through B9 are of a logic 1, output B1 is of a logic 0, gate 18 will go high, so long as a line 22 is high. This condition exists when an actual start bit has been received and at the mid bit position thereof, as hereinafter explained. It will be appreciated that clock pulses from source 16 are fed to a divider 24 which in turn provides output clock pulses MC on line 26 at a rate equal to the bit rate. The bit rate clock pulses MC are fed to a counter 28 with output lines 30 and 32, each going high when a corresponding predetermined count has been reached.

A flip flop circuit FF 1 is appropriately connected to the output of gate 18, such that it is set when gate 18 is enabled upon the detection of a start bit at mid bit position. This causes a line 34 to go low, which in turn removes the reset from divider 24 and counter 28. Since divider 24 is enabled at or near mid-bit time of a start bit, the first bit rate clock pulse MC will occur at mid-bit time of the first data bit. These bit rate clocks are fed to AND gate 36 by way of line 38 to enable gate 36 if line 40 is high. This provides receive data clock signals RDCK which are fed to appropriate circuitry, not illustrated, to control the strobing of the received data. It will be appreciated that each RDCK occurs at the center of a received data bit. This prevents erroneous sampling of the data near the leading or trailing bit edges.

Each bit rate clock pulse MC is counted by a counter 28 which is set up such that line 30 goes high after a predetermined count equal to the number of data bits in a character. In the example described in the drawings there are eight data bits per character. When line 30 goes high, a flip flop FF 2 is reset, causing a line 40 to go low and disable gate 36. This discontinues the RDCK pulses, such that any data received after the digital data is not strobed. Typically, if the transmission is properly received, a logic 1 stop bit follows the digital data bits and the MC at the middle of the stop bit is counted by counter 28, causing a line 32 to go high. This resets FF 1, causing line 34 to go high such that gate 18 will be enabled upon receipt of the next start bit.

Parity of the received data character may be checked by utilizing a checker flip flop FF 3 which toggles only when both the J and K inputs go high. FF 3 is reset when line 34 goes high at mid bit time of a detected start bit. It will be appreciated that if "even" parity of the data exists, line 42 will be low at mid-bit time of the stop bit. Stop bit logic 1 is inverted at 43 such that line 44 will be low and the output of OR gate 46 will also be low. In the event that the stop bit (1) is not detected or even parity does not exist, line 44 or line 42 will be high and the output of gate 46 will go high providing an FPE signal indicating a framing or parity error which is strobed upon the ninth count by the other appropriate circuitry, not illustrated.

Figure 2:
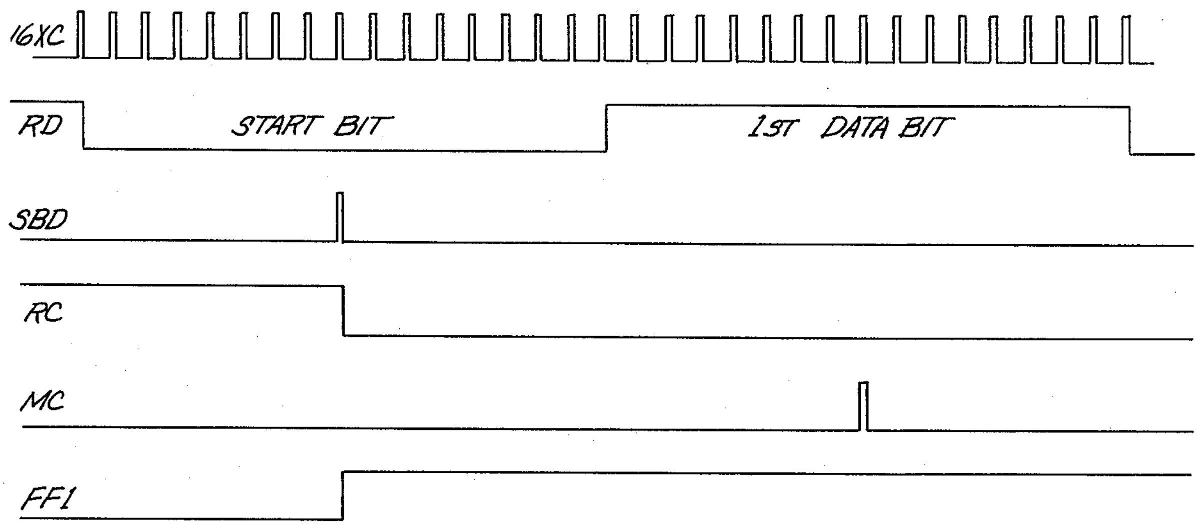
FIG. 2 is a timing chart illustrating the various logic levels during detection of a start bit of a received character.

Referring to FIG. 2, the timing chart illustrates the logic levels at various points in the receiver circuit during receipt of a start bit and first data bit. Since the 16XC clock pulses occur at significant multiple of the bit rate, a 16XC clock will always closely precede a transition associated with an actual start bit. This clock provides a 1 sample which is inverted by inverter 14 to provide a 0 input to the shift register. If in fact a start bit is being sampled, the next 8 samples shifted into the register will appear as 1's at the B2 through B9 outputs. At this point in time, the first sample will have been shifted to output B1 and inverted by invertor 20 to enable gate 18 to momentarily provide an SBD (Start Bit Detected). As shown in the timing chart in FIG. 2, SBD causes RC to go low and FF 1 to go high. Also, 16XC clocks (1 bit time) after SBD the first MC clock appears at or near the center of the first data bit. When sampling at a rate 16 times the bit rate, the MC pulses will occur within ± 1/32 bit width of the center of each data bit.

Figure 3:
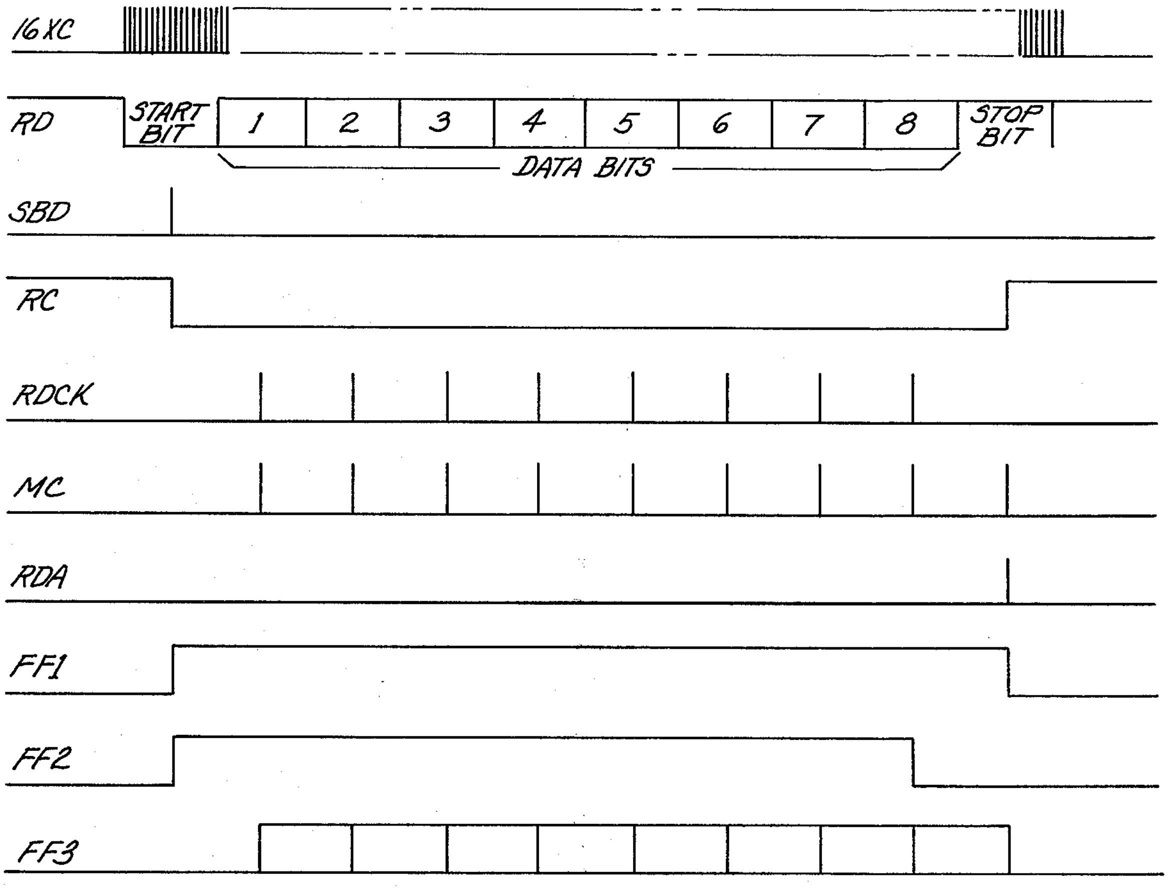
FIG. 3 is a timing chart illustrating the various logic levels in the receiver circuit during receipt of an entire character.

Referring to FIG. 3, the timing chart 4 an entire data character is illustrated. It will be appreciated that only a single SBD is provided for each character. This is due to the fact that gate 18 is disabled after a start bit has been detected. RDCK strobes each of the data bits at mid bit position and the MC clocks are provided through the stop bit, or ninth count. An RDA pulse is provided by counter 28 upon receipt of the stop bit to acknowledge that the data has been received. It will also be appreciated that after the stop bit has been received, FF 1 returns to its original state, whereby the start bit detector gate 18 may be enabled by receipt of the next start bit.

From the foregoing description, it will be appreciated that the asynchronous receiver of the present invention provides a relatively simple, yet highly versatile means for distinguishing between an actual start bit and a noise spike. Typically, noise spikes are of narrow width relative to the bit width of typical data transmission rates of, for example, 300 baud. While a spike may appear in the form of a transition to the 0 state, return to the original 1 state will occur in a relatively short time such that the start bit detector will distinguish the noise spike from an actual start bit by the subsequent samples. It will also be appreciated that by sampling to the mid point of the start bit, or taking a number of samples equal to one half of the bit time, the SBD initiates clocking of the MC pulses at mid bit time. Furthermore, the circuitry in effect disables the start bit detector (upon detection of a start bit) until the entire character has been received, at which time the detector is enabled to watch for the next start bit.

Of course, it is not intended that the present invention be limited to the circuitry illustrated in FIG. 1. The number of clock samples per bit may be changed if it is practical to do so. Also, the asynchronous receiver may be implemented in either a positive or a negative logic. While the asynchronous receiver of the present invention is intended to receiving transmitted data by way of a data modem, it may be utilized for start bit detection and receipt of data from various sources other than transmitted data received via modem such as provided in a DC keying arrangement.

While the invention has been particularly shown and described with reference to the preferred embodiment thereof, it will be understood by those skilled in the art that various changes in form and details may be made therein without departing from this spirit and scope of the invention.

What is claimed is:

1. A character start bit detector for an asynchronous receiver which receives digital data of predetermined bit rate, said detector comprising:

clock generator means for providing clock signals at a clock rate which is a predetermined multiple of said bit rate, memory means for storing sample signals representative of the received digital data at said clock rate, means for decoding said sample signals stored in said memory means and providing a start bit detection signal in response to a predetermined consecutive number of said stored sample signals being of the same logic level and at least one of said stored sample signals being of the opposite logic level, and means for inhibiting said decoding means in response to said start bit detection signal.

2. A character start bit detector for an asynchronous receiver which receives digital data of predetermined bit rate, said detector comprising:

clock generator means for providing clock signals at a clock rate which is a predetermined multiple of said bit rate, memory means for storing sample signals representative of the received digital data at said clock rate, and means for decoding said sample signals stored in said memory means and providing a start bit detection signal in response to a predetermined consecutive number of said stored sample signals being of the same logic level and at least one of said stored sample signals being of the opposite logic level, said predetermined number of sample signals corresponding in time to approximately one half of the bit time, whereby said start bit detection signal occurs near mid bit time.

3. A character start bit detector for an asynchronous receiver which receives digital data of predetermined bit rate, said detector comprising:

clock generator means for providing clock signals at a clock rate which is a predetermined multiple of said bit rate, memory means for storing sample signals representative of the received digital data at said clock rate, means for decoding said sample signals stored in said memory means and providing a start bit detection signal in response to a predetermined consecutive number of said stored sample signals being of the same logic level and at least one of said stored sample signals being of the opposite logic level, and bit rate counter means enabled in response to the occurrence of said start bit detection signal for providing a count representative of the number of data bits following a character start bit, said stored sample signal of opposite logic level being the logic level of the input data immediately prior to a transition at the leading edge of a character start bit.

4. For use with an asynchronous receiver which receives digital data characters at a predetermined bit rate, a start bit detector comprising:

first means for sampling the received digital data and providing a first logic signal upon detection of a character start bit, said first logic signal occurring in time near the center of said start bit;

second means responsive to said first logic signal to provide a second logic signal for inhibiting said first means; and bit rate pulse generating means enabled by said second logic signal to initiate generation of pulses at the center of said detected start bit whereby a pulse occurs at the center of each succeeding bit of the character to control strobing at mid bit position.

5. The receiver set forth in claim 4 including counter means for counting the number of said pulses subsequent to detection of a character start bit, said counter means initiating count in response to said second logic signal and enabling said first means upon reaching a predetermined count corresponding to a predetermined bit count.

6. The receiver set forth in claim 4 wherein said first means samples the received data at a clock rate which is a predetermined multiple of said bit rate.

* * * * *